United States Patent [19]

Shiflett et al.

[11] Patent Number: 5,700,388

[45] Date of Patent: Dec. 23, 1997

[54] AZEOTROPIC OR AZEOTROPE-LIKE COMPOSITIONS OF AMMONIA AND TETRAFLUOROETHANE

[75] Inventors: Mark Brandon Shiflett, Newark; Akimichi Yokozeki, Wilmington, both of Del.

[73] Assignee: E. I. du Pont de Nemours and Company, Wilmington, Del.

[21] Appl. No.: 330,453

[22] Filed: Oct. 28, 1994

Related U.S. Application Data

[62] Division of Ser. No. 951,734, Sep. 25, 1992, Pat. No. 5,387,357.

[51] Int. Cl.[6] .................... C09K 5/04; C09K 3/30
[52] U.S. Cl. .................. 252/67; 252/305; 62/114; 62/324.1; 264/53; 264/DIG. 5; 510/177; 510/409
[58] Field of Search .................. 252/67, 68, 153, 252/172, 305, DIG. 9; 62/114, 324.1; 264/53, DIG. 5; 510/177, 256, 409, 412, 415

[56] References Cited

U.S. PATENT DOCUMENTS

| | | | |
|---|---|---|---|
| 1,631,573 | 6/1927 | Barsky | 252/67 |
| 3,732,150 | 5/1973 | Bailey | 203/44 |
| 3,874,965 | 4/1975 | Greenwald et al. | 264/53 |
| 4,216,660 | 8/1980 | Rodgers | 62/238.2 |
| 4,724,679 | 2/1988 | Rademacher | 62/101 |
| 5,124,395 | 6/1992 | Abramowski et al. | 524/462 |
| 5,387,357 | 2/1995 | Shiflett et al. | 252/67 |
| 5,433,880 | 7/1995 | Minor et al. | 252/67 |

FOREIGN PATENT DOCUMENTS

| | | |
|---|---|---|
| 428402 | 5/1991 | European Pat. Off. . |
| 39 09 105 | 9/1990 | Germany . |
| 58-13687 | 1/1983 | Japan . |
| 61-255977 | 11/1986 | Japan . |
| 286902 | 1/1971 | U.S.S.R. . |
| 597703 | 3/1978 | U.S.S.R. . |

OTHER PUBLICATIONS

International Search Report of International Appln. No. PCT/US93/08608, international filing date is Sep. 17, 1993.

Moshfeghian et al., *Fluid Phase Equilibria*, vol. 80, pp. 33–44, 1992, no month available.

ARTI Refrigerant Database prepared by J. Calm for the Air–Conditioning and Refrigeration Technology Institute, Apr. 30, 1992.

Kruse, H., *DKV–Statusber Dtsch Kaelte–Klimatcsh Ver*, vol. 11 Aug. 1992.

*Primary Examiner*—Douglas J. McGinty
*Attorney, Agent, or Firm*—K. K. King

[57] ABSTRACT

Constant boiling azeotropic or azeotrope-like compositions of ammonia and 1,1,1,2-tetrafluoroethane, 1,1,2,2-tetrafluoroethane, difluoromethane, pentafluoroethane or 1,1,1,2,3,3,3-heptafluoropropane are disclosed that are useful as refrigerants, aerosol propellants, heat transfer media, gaseous dielectrics, fire extinguishing agents, expansion agents for polyolefins and polyurethanes and as power cycle working fluids.

4 Claims, No Drawings

AZEOTROPIC OR AZEOTROPE-LIKE COMPOSITIONS OF AMMONIA AND TETRAFLUOROETHANE

This is a division of application Ser. No. 07/951,734, filed Sep. 25, 1992, now U.S. Pat. No. 5,387,357.

FIELD OF THE INVENTION

This invention relates to binary azeotropic or azeotrope-like compositions of ammonia and 1,1,1,2-tetrafluoroethane, 1,1,2,2-tetrafluoroethane, difluoromethane, pentafluoroethane, or 1,1,1,2,3,3,3-heptafluoropropane, said compositions being useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Chlorofluorocarbons and hydrochlorofluorocarbons have many uses, one of which is used as a refrigerant. Such refrigerants include dichlorodifluoromethane (CFC-12) and chlorodifluoromethane (HCFC-22).

In recent years it has been pointed out that certain kinds of chlorofluorocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which cause the refrigerant to become flammable or to have poor refrigeration performance.

Accordingly, it is desirable to use as a refrigerant a single fluorinated hydrocarbon or an azeotropic or azeotrope-like composition that includes one or more fluorinated hydrocarbons.

Fluorinated hydrocarbons may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosols, as heat transfer media, gaseous dielectrics, fire extinguishing agents, power cycle working fluids, such as for heat pumps, inert media for polymerization reactions, fluids for removing particulates from metal surfaces, as carrier fluids that may be used, for example, to place a fine film of lubricant on metal parts, or as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of azeotropic or azeotrope-like compositions comprising admixtures of effective amounts of ammonia and 1,1,1,2-tetrafluoroethane, 1,1,2,2-tetrafluoroethane, difluoromethane, pentafluoroethane or 1,1,1,2,3,3,3-heptafluoropropane to form an azeotropic or azeotrope-like composition.

One way to define the invention is in terms of weight percents of the components. Azeotropic or azeotrope-like compositions of the invention include about 1 to 3 and 20 to 99 weight percent ammonia and about 1 to 80 or 97 to 99 weight percent 1,1,1,2-tetrafluoroethane, wherein said composition boils at 0° C. when the pressure is adjusted to about 46.7 to 70.4 psia; about 1 to 10 and 40 to 99 weight percent ammonia and about 1 to 60 and 90 to 99 weight percent 1,1,2,2-tetraflouroethane wherein said composition boils at 0° C. when the pressure is adjusted to about 33.9 to 61.9 psia; about 1 to 20 weight percent ammonia and about 80 to 99 weight percent difluoromethane, wherein said composition boils at 0° C. when the pressure is adjusted to about 111.5 to 118.3 psia; about 1 to 40 weight percent ammonia and about 60 to 99 weight percent pentafluoroethane, wherein said composition boils at 0° C. when the pressure is adjusted to about 82.5 to 94.8 psia; or about 30 to 99 weight percent ammonia and about 1 to 70 weight percent 1,1,1,2,3,3,3-heptafluoropropane, wherein said composition boils at 0° C. when the pressure is adjusted to about 62.0 to 66.2 psia.

DETAILED DESCRIPTION

The compositions of the present invention are constant-boiling or substantially constant-boiling, azeotropic or azeotrope-like compositions, or mixtures, comprising effective amounts of ammonia ($NH_3$, boiling point=−33.4° C.) and 1,1,1,2-tetrafluoroethane (HFC-134a or $CFH_2CF_3$, boiling point=−26.5° C.), or effective amounts of ammonia and 1,1,2,2-tetrafluoroethane (HFC-134 or $CHF_2CHF_2$, boiling point=−19.7° C.), or effective amounts of ammonia and difluoromethane(HFC-32 or $CH_2F_2$, boiling point=−51.7° C.), or effective amounts of ammmonia and pentafluoroethane (HFC-125 or $CF_2HCF_3$, boiling point =−48.5° C.), or effective amounts of ammonia and 1,1,1,2,3,3,3-heptafluoropropane (HFC-227ea or $CF_3CHFCF_3$, boiling point =−18.0° C.) to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial compositional change.

One way to define the invention is in terms of weight percents of the components. Constant-boiling, azeotropic or azeotrope-like compositions of ammonia and 1,1,1,2-tetrafluoroethane comprise about 1 to 3 and 20 to 99 weight percent ammonia and about 1 to 80 and 97 to 99 weight percent 1,1,1,2-tetrafluoroethane, wherein said composition boils at 0° C. when the pressure is adjusted to about 46.7 to 70.4 psia. A preferred composition of the invention is the azeotrope, which comprises about 37.9 weight percent ammonia and about 62.1 weight percent 1,1,1,2-tetrafluoroethane and which boils at 0° C. at 70.4 psia.

The constant-boiling, azeotropic or azeotrope-like compositions of ammonia and 1,1,2,2-tetrafluoroethane comprise about 1 to 10 and 40 to 99 weight percent ammonia and about 1 to 60 and 90 to 99 weight percent 1,1,2,2-tetrafluoroethane, wherein said composition boils at 0° C. when the pressure is adjusted to about 33.9 to 61.9 psia. A preferred composition of the invention is the azeotrope, which comprises about 90.6 weight percent ammonia and about 9.4 weight percent 1,1,2,2-tetrafluoroethane, and which boils at 0° C. at 61.9 psia.

The constant-boiling, azeotropic or azeotrope-like compositions of ammonia and difluoromethane comprise about 1 to 20 weight percent ammonia and about 80 to 99 weight percent difluoromethane, wherein said composition boils at 0° C. when the pressure is adjusted to about 111.5 to 118.3 psia. A preferred composition of the invention is the azeotrope, which comprises about 1.7 weight percent ammonia and about 98.3 weight percent difluoromethane, and which boils at 0° C. at 118.3 psia.

The constant-boiling, azeotropic or azeotrope-like compositions of ammonia and pentafluoroethane comprise about 1 to 40 weight percent ammonia and about 60 to 99 weight percent pentafluoroethane, wherein said composition boils at 0° C. when the pressure is adjusted to about 82.5 to 94.8 psia.

The constant-boiling, azeotropic or azeotrope-like compositions of ammonia and 1,1,1,2,3,3,3-heptafluoropropane comprise about 30 to 99 weight percent ammonia and about 1 to 70 weight percent 1,1,1,2,3,3,3-heptafluoropropane, wherein said composition boils at 0° C. when the pressure is adjusted to about 62.0 to 66.2 psia. A preferred composition of the invention is the azeotrope, which comprises about 44.0 weight percent ammonia and about 56.0 weight percent 1,1,1,2,3,3,3-heptafluoropropane, and which boils at 0° C. at 66.2 psia.

It is recognized in the art that a small difference between the dew point vapor pressure and the bubble point vapor pressure of a composition at a particular temperature is an indication that the composition is azeotropic or azeotrope-like. By a "small" difference is meant a difference in dew point vapor pressure and bubble point vapor pressure of about 10 percent or less. It has been unexpectedly found that compositions some distance away from the true azeotropes of ammonia and 1,1,1,2-tetrafluoroethane, ammonia and 1,1,2,2-tetrafluoroethane, ammonia and difluoromethane, and ammonia and 1,1,1,2,3,3,3-heptafluoropropane have differences in dew point and bubble point vapor pressures of about 10 percent or less. In addition, ammonia and pentafluoroethane exhibit small differences in dew point and bubble point vapor pressures over a wide composition range despite no azeotrope point.

Therefore, included in this invention are compositions of effective amounts of ammonia and 1,1,1,2-tetrafluoroethane or compositions of effective amounts of ammonia and 1,1,2,2-tetrafluoroethane or compositions of effective amounts of ammonia and difluoromethane or compositions of effective amounts of ammonia and pentafluoroethane or compositions of effective amounts of ammonia and 1,1,1,2,3,3,3-heptafluoropropane such that the compositions have a difference in dew point vapor pressure and bubble point vapor pressure of about 10 percent or less at a specified temperature.

It is also recognized in the art, as discussed in U.S. Pat. No. 4,810,403, the text of which is incorporated herein by reference, that a mixture is azeotropic or azeotrope-like if, after 50 wt. % of the mixture is removed, such as by evaporation or boiling off, the difference in vapor pressure between the original mixture and the mixture remaining after 50 wt. % of the original has been removed is less than 10%, when measured in absolute units. By absolute units is meant measurements of pressure in, for example, psia, atmospheres, bars, torr, dynes per square centimeter, millimeters of mercury, inches of water, and other equivalent terms well known in the art.

Therefore, included in this invention are mixtures of effective amounts of ammonia and 1,1,1,2-tetrafluoroethane, ammonia and 1,1,2,2-tetrafluoroethane, ammonia and difluoromethane, ammonia and pentafluoroethane, or ammonia and 1,1,1,2,3,3,3-heptafluoropropane such that after 50 wt. % of the mixture is removed, such as by evaporation or boiling off, the difference in vapor pressure between the original mixture and the mixture remaining after 50 wt. % of the original has been removed is less than 10%.

For purposes of this invention, "effective amount" is defined as the amount of each component of the inventive admixture which, when combined, results in the formation of an azeotropic or azeotrope-like composition. This definition includes the mounts of each component, which amounts may vary depending upon the pressure applied to the composition so long as the azeotropic or azeotrope-like compositions continue to exist at the different pressures, but with possible different boiling points. Therefore, effective amount includes the amounts, such as may be expressed in weight percentages, of each component of the compositions of the present invention which form azeotropic or azeotrope-like compositions at pressures other than the pressures described herein.

For the purpose of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties.

As is well recognized in this art, there is a range of compositions which contain the same components as the azeotrope, which not only will exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

* The composition can be defined as an azeotrope of A, B, C (and D . . . ) since the very term "azeotrope" is at once both definitive and limitative, and requires that effective amounts of A, B, C (and D . . . ) form this unique composition of matter which is a constant boiling admixture.

* It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, the compositional ranges, rather than fixed compositions, are often used to define azeotropes.

* The composition can be defined as a particular weight percent relationship or mole percent relationship of A, B, C (and D . . . ), while recognizing that such specific values point out only one particular such relationship and that in actuality, a series of such relationships, represented by A, B, C (and D . . .) actually exist for a given azeotrope, varied by the influence of pressure.

* An azeotrope of A, B, C (and D . . . ) can be characterized by defining the composition as an azeotrope characterized by a boiling point at a given pressure, thus giving identifying characteristics without unduly limiting the scope of the invention by a specific numerical composition, which is limited by and is only as accurate as the analytical equipment available.

The azeotropic or azeotrope-like compositions of the present invention can be prepared by any convenient method including mixing or combining the desired component amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

A phase study was made on various compositions wherein the composition was varied and the vapor pressures measured, at a constant temperature of 0° C. The following azeotropic compositions were obtained as evidenced by the maximum vapor pressure observed and were identified as follows:

TABLE 1

(All at 0° C.)

| Component 1 | Component 2 | Vapor Pressure psia (kPa) |
| --- | --- | --- |
| 37.9 wt. % NH3 | 62.1 wt. % HFC-134a | 70.4 (485.3) |
| 90.6 wt. % NH3 | 9.4 wt. % HFC-134 | 61.9 (426.7) |
| 1.7 wt. % NH3 | 98.3 wt. % HFC-32 | 118.3 (815.5) |
| 44.0 wt. % NH3 | 56.0 wt. % HFC-227ca | 66.2 (456.3) |

EXAMPLE 2

The dew point vapor pressure and bubble point vapor pressure of a particular composition is measured at a constant temperature of 0° C. The results are summarized below.

TABLE 2

($NH_3$ and HFC-134a)

Bubble/Dew Point @ 0° C.

| $NH_3$ | Bubble point | | Dew Point | | Difference |
| --- | --- | --- | --- | --- | --- |
| (wt %) | (psia) | (kPa) | (psia) | (kPa) | (%) |
| 0 | 43.1 | 297.2 | 43.1 | 297.2 | 0.0 |
| 1 | 46.7 | 321.9 | 44.6 | 307.5 | 4.5 |
| 2 | 49.9 | 344.1 | 46.1 | 317.9 | 7.6 |
| 3 | 52.6 | 362.7 | 47.5 | 327.5 | 9.7 |
| 4 | 55.0 | 379.3 | 48.9 | 337.2 | 11.1 |
| 10 | 63.6 | 438.4 | 56.3 | 388.1 | 11.5 |
| 20 | 68.8 | 474.3 | 64.9 | 447.4 | 5.7 |
| 30 | 70.2 | 483.9 | 69.4 | 478.4 | 1.1 |
| 40 | 70.4 | 485.3 | 70.3 | 484.6 | 0.1 |
| 50 | 70.1 | 483.2 | 68.9 | 475.0 | 0.3 |
| 60 | 69.6 | 479.8 | 70.4 | 485.3 | 1.1 |
| 70 | 68.7 | 473.6 | 70.0 | 482.5 | 1.9 |
| 80 | 67.4 | 464.6 | 69.1 | 476.3 | 2.5 |
| 90 | 65.4 | 450.8 | 67.2 | 463.2 | 2.8 |
| 99 | 62.2 | 428.8 | 62.7 | 432.2 | 0.8 |
| 100 | 61.8 | 426.0 | 61.8 | 426.0 | 0.0 |

Compositions of about 1 to 3 and 20 to 99 weight percent ammonia and about 1 to 80 and 97 to 99 weight percent 1,1,1,2-tetrafluoroethane exhibit a difference in dew and bubble point vapor pressures of less than about 10% at 0° C., which indicates that the compositions are essentially constant-boiling.

The preferred composition according to the present invention is the azeotrope which comprises 37.9 weight percent ammonia and 62.1 weight percent 1,1,1,2-tetrafluoroethane, and which boils at 0° C. at 70.4 psia.

TABLE 3

($NH_3$ and HFC-134)

Bubble/Dew Point @ 0° C.

| $NH_3$ | Bubble point | | Dew Point | | Difference |
| --- | --- | --- | --- | --- | --- |
| (wt %) | (psia) | (kPa) | (psia) | (kPa) | (%) |
| 0 | 32.6 | 224.7 | 32.6 | 224.7 | 0.0 |
| 1 | 33.9 | 233.7 | 33.3 | 229.6 | 1.8 |
| 10 | 43.6 | 300.6 | 39.4 | 271.6 | 9.6 |
| 20 | 50.8 | 350.2 | 44.7 | 308.1 | 12.0 |
| 30 | 55.3 | 381.2 | 49.0 | 337.8 | 11.4 |
| 40 | 58.1 | 400.5 | 52.6 | 362.6 | 9.5 |
| 50 | 59.8 | 412.2 | 55.7 | 384.0 | 6.9 |
| 60 | 60.8 | 419.1 | 58.2 | 401.2 | 4.3 |

TABLE 3-continued (NH₃ and HFC-134)

| NH₃ | Bubble point | | Dew Point | | Difference |
|---|---|---|---|---|---|
| (wt %) | (psia) | (kPa) | (psia) | (kPa) | (%) |
| 70 | 61.5 | 424.0 | 60.2 | 415.0 | 2.1 |
| 80 | 61.8 | 426.0 | 61.5 | 424.0 | 0.5 |
| 90 | 61.9 | 426.7 | 61.9 | 426.7 | 0.0 |
| 99 | 61.8 | 426.0 | 61.9 | 426.7 | 0.2 |
| 100 | 61.8 | 426.0 | 61.8 | 426.0 | 0.0 |

Compositions of about 1 to 10 and 40 to 99 weight percent ammonia and about 1 to 60 and 90 to 99 weight percent 1,1,2,2-tetrafluoroethane exhibit a difference in dew and bubble point vapor pressures of less than about 10% at 0° C., which indicates that the compositions are essentially constant-boiling.

The preferred composition according to the present invention is the azeotrope which comprises 90.6 weight percent ammonia and 9.4 weight percent 1,1,2,2-tetrafluoroethane, and which boils at 0° C. at 61.9 psia.

TABLE 4

(NH₃ and HFC-32)

| NH₃ | Bubble point | | Dew Point | | Difference |
|---|---|---|---|---|---|
| (wt %) | (psia) | (kPa) | (psia) | (kPa) | (%) |
| 0 | 118.2 | 814.8 | 118.2 | 814.8 | 0 |
| 1 | 118.3 | 815.5 | 118.3 | 815.5 | 0 |
| 10 | 116.2 | 801.0 | 114.8 | 791.4 | 1.2 |
| 20 | 111.5 | 768.6 | 103.7 | 714.9 | 7.0 |
| 25 | 109.0 | 751.4 | 97.6 | 672.8 | 10.5 |
| 30 | 106.5 | 734.2 | 70.6 | 486.7 | 33.8 |

Compositions of about 1 to 20 weight percent ammonia and 80 to 99 weight percent difluoromethane exhibit a difference in dew and bubble point vapor pressures of less than about 10% at 0° C., which indicates that the compositions are essentially constant-boiling.

The preferred composition according to the present invention is the azeotrope which comprises 1.7 weight percent ammonia and 98.3 weight percent difluoromethane, and which boils at 0° C. at 118.3 psia.

TABLE 5

(NH₃ and HFC-125)

| NH₃ | Bubble point | | Dew Point | | Difference |
|---|---|---|---|---|---|
| (wt %) | (psia) | (kPa) | (psia) | (kPa) | (%) |
| 0 | 97.5 | 672.1 | 97.5 | 672.1 | 0.0 |
| 1 | 94.8 | 653.5 | 94.0 | 648.0 | 0.8 |
| 10 | 87.3 | 601.8 | 87.1 | 600.4 | 0.2 |
| 20 | 85.6 | 590.1 | 85.0 | 585.9 | 0.7 |
| 30 | 83.9 | 578.4 | 80.6 | 555.6 | 3.9 |
| 40 | 82.5 | 568.7 | 74.7 | 514.9 | 9.5 |
| 50 | 81.3 | 560.4 | 70.7 | 487.4 | 13.0 |
| 60 | 80.2 | 552.9 | 67.9 | 468.1 | 15.3 |

TABLE 5-continued (NH₃ and HFC-125)

| NH₃ | Bubble point | | Dew Point | | Difference |
|---|---|---|---|---|---|
| (wt %) | (psia) | (kPa) | (psia) | (kPa) | (%) |
| 70 | 78.6 | 541.8 | 65.9 | 454.3 | 16.2 |
| 80 | 75.7 | 521.8 | 64.4 | 443.9 | 14.9 |
| 90 | 70.7 | 487.4 | 63.2 | 435.7 | 10.6 |
| 99 | 63.3 | 436.4 | 62.3 | 429.5 | 1.6 |
| 100 | 61.8 | 426.0 | 61.8 | 426.0 | 0.0 |

Compositions of about 1 to 40 weight percent ammonia and 60 to 99 weight percent pentafluoroethane exhibit a difference in dew and bubble point vapor pressures of less than about 10% at 0° C., which indicates that the compositions are essentially constant-boiling.

TABLE 6

(NH₃ and HFC-227ea)

| NH₃ | Bubble point | | Dew Point | | Difference |
|---|---|---|---|---|---|
| (wt %) | (psia) | (kPa) | (psia) | (kPa) | (%) |
| 0 | 28.5 | 196.5 | 28.5 | 196.5 | 0.0 |
| 1 | 35.1 | 242.0 | 31.6 | 217.8 | 10.0 |
| 20 | 64.4 | 443.9 | 56.7 | 390.9 | 12.0 |
| 30 | 65.8 | 453.6 | 63.3 | 436.4 | 3.8 |
| 40 | 66.2 | 456.3 | 66.0 | 455.0 | 0.3 |
| 50 | 66.2 | 456.3 | 65.9 | 454.3 | 0.5 |
| 60 | 66.0 | 455.0 | 65.2 | 449.5 | 1.2 |
| 90 | 63.8 | 439.8 | 65.8 | 453.6 | 3.0 |
| 99 | 62.0 | 427.4 | 62.8 | 432.9 | 1.3 |
| 100 | 61.8 | 426.0 | 61.8 | 426.0 | 0.0 |

Compositions of about 30 to 99 weight percent ammonia and 1 to 70 weight percent 1,1,1,2,3,3,3-heptafluoropropane exhibit a difference in dew and bubble point vapor pressures of less than about 10% at 0° C., which indicates that the compositions are essentially constant-boiling.

The preferred composition according to the present invention is the azeotrope which comprises 44.0 weight percent ammonia and 56.0 weight percent 1,1,1,2,3,3,3-heptafluoropropane, and which boils at 0° C. at 66.2 psia.

COMPARATIVE EXAMPLE 3

The bubble point vapor pressure and dew point vapor pressure at a constant temperature of 0° C. of several known non-azeotropic compositions are measured. The results are summarized below.

| Composition | bubble point vapor press. psia (kPa) | dew point vapor press. psia (kPa) | % difference |
|---|---|---|---|
| 50 wt. % chlorodifluoromethane and 50 wt. % 1,2-dichlorotetrafluoroethane | 55.1 (379.9) | 29.2 (201.4) | 47% |

-continued

| Composition | bubble point vapor press. psia (kPa) | dew point vapor press. psia (kPa) | % difference |
|---|---|---|---|
| 50 wt. % chlorodifluoromethane and 50 wt. % chlorotetrafluoroethane | 52.9 (364.8) | 39.1 (269.6) | 26.1% |

EXAMPLE 4

A study compares the refrigeration properties of the azeotropic mixtures of the invention with the following single component refrigerants: R-22, 1,1,1,2-tetrafluoroethane, ammonia ($NH_3$), difluoromethane, and pentafluoroethane. The refrigeration capacity is based on a compressor with a fixed displacement of 3.5 cubic feet per minute. The data are based on a refrigeration cycle with a suction-line heat exchanger. The data are based on the following conditions.

| Condenser temp. | 130° F. | 54.4° C. |
|---|---|---|
| Liquid line temp. | 115° F. | 46.1° C. |
| Evaporator temp. | 45° F. | 7.2° C. |
| Return gas temp. | 65° F. | 18.3° C. |
| Isentropic efficiency | 0.75 | |

TABLE 7

| Refrigerant (wt %) | Capacity (Btu/min) | Capacity (Watts) | COP | Compressor Discharge Temp (°F.) | Compressor Discharge Temp (°C.) |
|---|---|---|---|---|---|
| HCFC-22 | 350 | 6151 | 3.4 | 213 | 101 |
| HFC-134a | 227 | 3989 | 3.4 | 173 | 78 |
| $NH_3$ | 417 | 7329 | 3.6 | 327 | 164 |
| $NH_3$/HFC-134a | | | | | |
| (5/95) | 281 | 4938 | 3.5 | 188 | 87 |
| (15/85) | 348 | 6115 | 3.5 | 212 | 100 |
| (25/75) | 387 | 6801 | 3.6 | 233 | 112 |
| (35/65) | 409 | 7188 | 3.6 | 251 | 122 |
| $NH_3$/HFC-134 | | | | | |
| (5/95) | 226 | 3972 | 3.6 | 190 | 88 |
| (15/85) | 278 | 4886 | 3.7 | 218 | 103 |
| (25/75) | 313 | 5501 | 3.7 | 239 | 115 |
| (35/65) | 339 | 5958 | 3.7 | 257 | 125 |
| (90/10) | 411 | 7223 | 3.6 | 319 | 159 |
| HFC-32 | 552 | 9701 | 3.1 | 254 | 123 |
| $NH_3$/HFC-32 | | | | | |
| (10/90) | 440 | 7733 | 3.6 | 320 | 160 |
| HFC-125 | 327 | 5747 | 2.7 | 164 | 73 |
| $NH_3$/HFC-125 | | | | | |
| (5/95) | 346 | 6081 | 3.0 | 177 | 81 |
| (10/90) | 372 | 6538 | 3.1 | 190 | 88 |
| (15/85) | 394 | 6924 | 3.3 | 202 | 94 |
| (25/75) | 423 | 7434 | 3.4 | 224 | 107 |
| (30/70) | 431 | 7575 | 3.4 | 234 | 112 |
| (35/65) | 436 | 7662 | 3.5 | 244 | 118 |
| (50/50) | 443 | 7785 | 3.5 | 268 | 131 |
| (70/30) | 449 | 7891 | 3.7 | 291 | 144 |
| $NH_3$/HFC-227ea | | | | | |
| (20/80) | 425 | 7469 | 5.2 | 141 | 61 |

Capacity is intended to mean the change in enthalpy of the refrigerant in the evaporator per pound of refrigerant circulated, i.e., the heat removed by the refrigerant in the evaporator per time.

Coefficient of performance (COP) is intended to mean the ratio of the capacity to the compressor work. It is a measure of refrigerant energy efficiency.

For a refrigeration cycle typified by the above conditions, one or both of the COP and capacity increase by adding ammonia to HFC-134a or HFC-134 or HFC-32 or HFC-125 or HFC-227ea. Also, the discharge temperature from the compressor decreases by adding HFC-134a or HFC-134 or HFC-32 or HFC-125 or HFC-227ea to ammonia, which is important for increasing the lifetime of the compressor. These results show that mixtures of ammonia and HFC-134a or HFC-134 or HFC-32 or HFC-125 or HFC-227ea will improve one or more of the following: capacity, energy efficiency, and discharge temperature of a refrigeration cycle when compared to ammonia alone.

The novel azeotropic or azeotrope-like mixtures of ammonia and 1,1,1,2-tetrafluoroethane or ammonia and 1,1,2,2-tetrafluoroethane or ammonia and difluoromethane or ammonia and pentafluoroethane or ammonia and 1,1,1,2,3,3,3-heptafluoropropane may be used to produce refrigeration by condensing the mixtures and thereafter evaporating the condensate in the vicinity of a body to be cooled.

The novel azeotropic or azeotrope-like mixtures may also be used to produce heat by condensing the refrigerant in the vicinity of the body to be heated and thereafter evaporating the refrigerant.

The use of azeotropic or azeotropic-like mixtures eliminates the problem of component fractionation and handling in system operations, because these mixtures behave essentially as a single substance. Several of the novel azeotrope-like mixtures also offer the advantage of being essentially nonflammable.

The novel azeotropic or azeotrope-like mixtures have zero ozone depletion potentials compared with Refrigerant 502, which has a 0.23 ozone depletion potential. The aforementioned data were taken from "Scientific Assessment of Stratospheric Ozone, 1989", UNEO/WMO AFEAS Report, Sep. 5, 1989.

In addition to refrigeration applications, the novel constant boiling compositions of the invention are also useful as aerosol propellants, heat transfer media, gaseous dielectrics, fire extinguishing agents, expansion agents for polyolefins and polyurethanes and as power cycle working fluids.

ADDITIONAL COMPOUNDS

Other components, such as aliphatic hydrocarbons having a boiling point of −60° to +30° C., hydrofluorocarbonalkanes having a boiling point of −60° to +30° C., hydrofluoropropanes having a boiling point of between −60° to +30° C., hydrocarbon esters having a boiling point between −60° to +30° C., hydrochlorofluorocarbons having a boiling point between −60° to +30° C., hydrofluorocarbons having a boiling point of −60° to +30° C., hydrochlorocarbons having a boiling point between −60° to +30° C., chlorocarbons and perfluorinated compounds, can be added to the azeotropic or azeotrope-like compositions described above without substantially changing the properties thereof, including the constant boiling behavior, of the compositions.

Additives such as lubricants, corrosion inhibitors, stabilizers, dyes and other appropriate materials may be added to the novel compositions of the invention for a variety of purposes provided they do not have an adverse influence on the composition, for their intended applications. Preferred lubricants include esters having a molecular weight greater than 250.

We claim:

1. A mixture consisting essentially of an azeotropic or azeotrope-like composition consisting of either (a) 20 to 99 weight percent ammonia and about 1 to 80 weight percent 1,1,1,2-tetrafluoroethane, wherein said composition boils at about 0° C. when the pressure is adjusted to about 62.2 to 70.4 psia; or (b) about 40 to 99 weight percent ammonia and about 1 to 60 weight percent 1,1,2,2-tetrafluoroethane, wherein said composition boils at about 0° C. when the pressure is adjusted to about 58.1 to 61.9 psia.

2. The mixture of claim 1 consisting essentially of azeotropic compositions consisting of about 37.9 weight percent ammonia and about 62.1 weight percent 1,1,1,2-tetrafluoroethane; or about 90.6 weight percent ammonia and about 9.4 weight percent 1,1,2,2-tetrafluoroethane.

3. A process of producing refrigeration, which comprises condensing a composition of claim 1 and thereafter evaporating said composition in the vicinity of a body to be cooled.

4. A process for producing heat which comprises condensing a composition of claim 1 in the vicinity of a body to be heated and thereafter evaporating said composition.

* * * * *